US008650994B2

(12) United States Patent
Roden

(10) Patent No.: US 8,650,994 B2
(45) Date of Patent: Feb. 18, 2014

(54) MULTIPLE TOOL STATION BLOCK FOR Y-AXIS MACHINE

(76) Inventor: Tony Ray Roden, Burleson, TX (US)

( * ) Notice: Subject to any disclaimer, the term of this patent is extended or adjusted under 35 U.S.C. 154(b) by 333 days.

(21) Appl. No.: 12/931,643

(22) Filed: Feb. 7, 2011

(65) Prior Publication Data

US 2012/0060336 A1  Mar. 15, 2012

Related U.S. Application Data

(60) Provisional application No. 61/403,018, filed on Sep. 9, 2010.

(51) Int. Cl.
  *B23B 29/24* (2006.01)
(52) U.S. Cl.
  CPC .................................... *B23B 29/24* (2013.01)
  USPC ............................. 82/158; 82/161; 407/108
(58) Field of Classification Search
  USPC ............ 82/158, 159, 160, 161; 407/102, 107, 407/108, 112
  IPC ........... B23B 29/04, 29/06, 29/08, 29/20, 29/24, B23B 29/26, 29/34

See application file for complete search history.

(56) References Cited

U.S. PATENT DOCUMENTS

| 2,711,664 | A | * | 6/1955 | Misuraca | 82/161 |
| 3,354,527 | A | * | 11/1967 | Carlstedt et al. | 407/108 |
| 3,688,614 | A | * | 9/1972 | Hardin | 82/161 |
| 4,308,771 | A | * | 1/1982 | Windle | 82/158 |
| 6,796,207 | B1 | * | 9/2004 | Long et al. | 82/158 |
| 7,762,166 | B2 | * | 7/2010 | Giannetti | 82/50 |
| 2010/0307301 | A1 | * | 12/2010 | Zwara et al. | 82/158 |

FOREIGN PATENT DOCUMENTS

| CN | 101733420 A | * | 6/2010 |
| GB | 2054435 A | * | 2/1981 |
| GB | 1599585 | * | 10/1981 |

OTHER PUBLICATIONS

English machine translation of CN 101733420 A.*

* cited by examiner

*Primary Examiner* — Daniel Howell
*Assistant Examiner* — Alan Snyder
(74) *Attorney, Agent, or Firm* — Geoffrey A. Mantooth

(57) ABSTRACT

A multiple tool station block for a machine having a Y-axis, such as a CNC machine, is provided.

14 Claims, 11 Drawing Sheets

MULTIPLE TOOL STATION BLOCK FOR Y-AXIS MACHINE

CROSS-REFERENCE TO RELATED APPLICATIONS

This application claims priority from U.S. Provisional Application Ser. No. 61/403,018, filed Sep. 9, 2010.

BACKGROUND OF THE INVENTION

1. Field of the Invention

This invention relates to computer numerically controlled (CNC) machines, and in particular to CNC machines having a Y-axis (an axis with a turret as found on Y-axis machines).

2. Description of the Related Art

Metal components of many devices and machines are typically machined using a number of processes so that they are the correct size and shape to fit in their designated location in the device and so that they and the device can perform the correct function. Work pieces may be machined, for example, by a drill press, gear shaper, hobbing machine, hone, lathe, screw machine, milling machine, shaper, saws, planer, grinding machine and others known in the art.

Machined components that were once made using manual controls are now made using machines with numerical control (NC), which is the automation of machine tools that are operated by abstractly programmed commands encoded on a storage medium, as opposed to manually controlled via handwheels or levers, or mechanically automated via cams alone. This method of manufacturing is augmented with analog and digital computers in modern computed numerically controlled (CNC) machine tools that have revolutionized the manufacturing process. Typically, these CNC systems utilize CAD/CAM programs. The programs produce a computer file that is interpreted to extract the commands needed to operate a particular machine via a postprocessor, and then loaded into the CNC machines for production.

Machining centers can perform a vast number of operations, from simple (e.g., turning, grooving, threading, boring, planing, and drilling) to complex (e.g., contouring, die sinking). The operations may be O.D. cuts (outer diameter) or I.D. cuts (inner diameter). Cutting fluid is often pumped to the cutting site to cool and lubricate the cut and to wash away the resulting debris. Since any particular component might require the use of a number of different tools—drills, saws, etc.—modern machines often combine multiple tools into a single "cell". In other cases, a number of different machines are used with an external controller and human or robotic operators that move the component from machine to machine. In either case, the complex series of steps needed to produce any part is highly automated and produces a part that closely matches the original CAD design.

The process of moving the article that is being machined from machine to machine of course takes more machines and also takes time and additional operators if manually done, and as a result the process is more expensive. The more machines that are used, the greater is the down time resulting in longer cycle times that come from too many tool changes and tool removal and reloading during the manufacturing process.

CNC machines may be configured in a variety of ways. Such machines, for example, may rotate a cutting tool in a spindle (milling machine) or rotate a work piece and move stationary cutting tools about the rotating work piece. More advanced CNC machines have many axes defined for example, by the axis of the spindle holding the work piece, by whether there is a turret, and by the orientation of the turret upon which tool holders are mounted.

Most CNC Y-axis machines (also called machining centers) are computer controlled horizontal lathes with the ability to move the spindle holding the work piece horizontally along the Z-axis. Machines with a Y-axis typically have a turret, with 12 stations, each of which holds a single tool. The turret may be rotated so that the appropriate tool is in position with respect to the work piece on a spindle. Thus a machine may have two spindles on opposite sides and a turret on a Y-axis slide. Mounting independently revolving tools, each held on a separate tool holder on the turret, makes it possible to perform complicated complete front and back machining using the Y-axis slide. Having a turret enables tools attached to the turret to be moved into position to machine any number of cuts of the work piece, depending on which of the tool holders on the rotating turret is moved into position so that the appropriate cut is made on the work piece. The tool holders on Y-axis turrets as known in the art do not hold multiple tools but typically have one tool in the center of the block that can perform one function on either the inner diameter or outer diameter of the work piece.

It is therefore an object of the invention to provide a multiple tool station block for a Y-axis machine, such as a CNC machine. The invention also provides an added benefit when a machine has too few tool stations by creating 2-4 times as many on a single turret.

Other objects and advantages will be more fully apparent from the following disclosure.

SUMMARY OF THE INVENTION

The invention herein is a multiple tool station block for a machine having a Y-axis, such as a CNC machine. Other objects and features of the inventions will be more fully apparent from the following disclosure.

DETAILED DESCRIPTION OF THE INVENTION AND PREFERRED EMBODIMENTS THEREOF

Prior tool holders for use on the turrets of Y-axis machines typically hold a single tool, or may allow for one tool on each side of the turret (front and rear); however the latter type of tool holders only perform one function of turning or boring each. Each tool is either an O.D. tool or an I.D. tool.

Because there are multiple tools on each tool block of the invention, set up time is reduced, and many more operations may be performed without physically removing the tool block and tools. With one set-up, placing 4-6 tools on a tool holder, with 12 holders per machine, 48-60 different types of cutting procedure can be accomplished without replacing a tool block on the machine with another tool block and without removing a tool from a tool block and replacing it with another, simply by rotating the turret and/or using the y-axis to shift the centerline for use of a particular tool block. The invention is completely customizable for a particular machine and for particular tools to be used.

The present invention provides a Y-axis multiple tool station block for a multi-axis machine, such as a CNC machine that has a Y-axis. The invention herein solves the issue of extended downtime during setups of the machine. In addition, the invention speeds up cycle times and reduces wear on the machine as well as saving electricity in the process. The invention herein utilizes the "Y" axis of the milling machine to produce fewer tool changes and increase the amount of tool stations on any given turret. In the invention herein, a "y" axis is utilized for cutting as is known in the art. Typically with the tool blocks of the invention and standard machines known in the art, up to 6 tools can be mounted in a single block of the invention, however, for larger machines, larger tool blocks, and potentially the stool stations blocks may be manufactured with more tool slots or tool bores.

The main component of the invention is a tool station block 10A (O.D. tool station block) or 10B (I.D. tool station block) which mounts to a turret as known in the art (not shown) that allows for offset tooling spaces that utilize "y" axis offsets so that multiple tools can be used on one turret station. The invention increases the number of tools that can be mounted and used during the production process, thereby virtually eliminating downtime and minimizing axis movements that will decrease cycle times, wear, and electricity.

Figure 12:
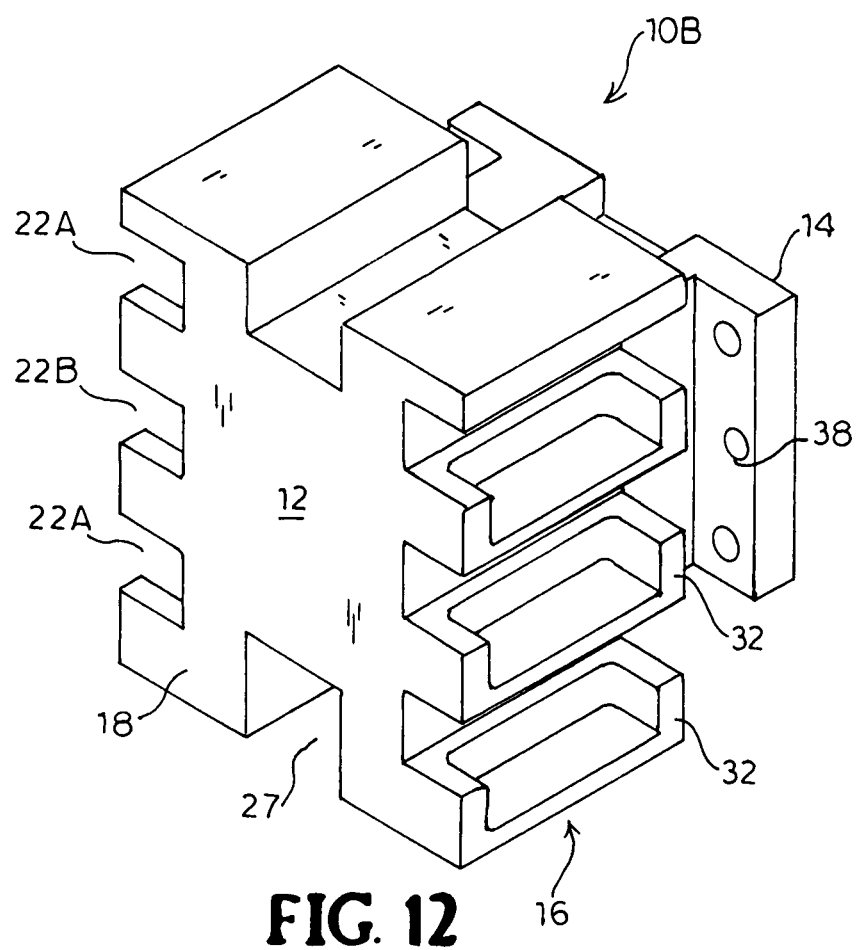
FIG. 12 is a perspective view of a 6-tool O.D. block having wedge spaces for each tool.

While the dimensions of each tool station block made according to the invention herein are constrained by the machine for which they are made, it may be helpful to provide exemplary dimensions for a tool station block made for a particular machine. Thus, the tool station block in FIG. 12 is made for a model SKT250 SY machine made by Hyundai-Wia, located in Fort Worth, Tex. The size of the top of this tool station block is 6.46 inches along the tool-holding sides and 5.5 inches along the non-tool holding sides. The height of the block is 5.75 inches, which includes 3.5 inches for the height of the tool holding side and 2.25 inches for the height of the base. The base is 5.5×3.95 inches. The height of the sloped wedge sites is 2.75 inches. The width of each tool slot 22A,B is one inch, for a one-inch tool, and the width of the span between tool slots 22A and 22B is one inch. There is a 1.5 inch wide weight reduction area on the non-tool holding sides.

As known in the art, the tool station blocks of the invention herein may have tool slots (O.D. block) or tool bores (I.D. block) sized for the various tool sizes known in the art, e.g., having tool shanks with a ⅝-inch, ¾-inch or 1-inch diameter. Smaller tool mean that either a smaller block may be used to hold the same number of tools, or that the block may be designed to hold more tools. While the figures show blocks having either O.D. tool slots or I.D. tool bores as is typical in the art, it is within the scope of the invention herein to have any combination of O.D. slots and I.D. tool bores on the same block.

The tool station block 10A,B of the invention has a top 12, a base 14 and four sides. The base 14 is structured to fit on a particular y-axis machine. For example, some of the tool station blocks shown in the figures herein are shown as having a base 14 with 6 bolt holes 38 (e.g., FIG. 2) so that the base 14 may be bolted to the turret of a y-axis machine that has this configuration of bolt holes. Various machines have VDI attachment tools that are standardized with ISO standards, and the base of blocks intended for use on such machines are designed to meet these standards, for example, with a large base bore 40.

Figure 7:
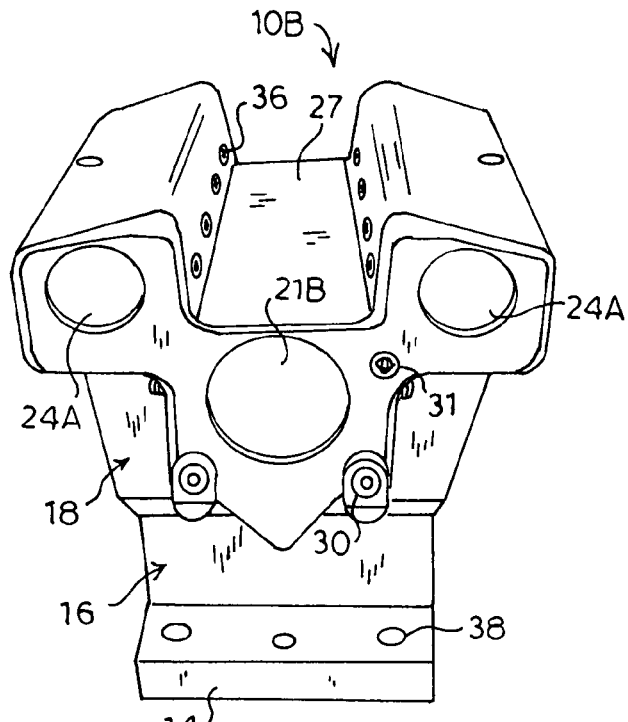
FIG. 7 is a side perspective view of a tool-holding side of a 6-tool I.D. tool block of the invention.
Figure 8:
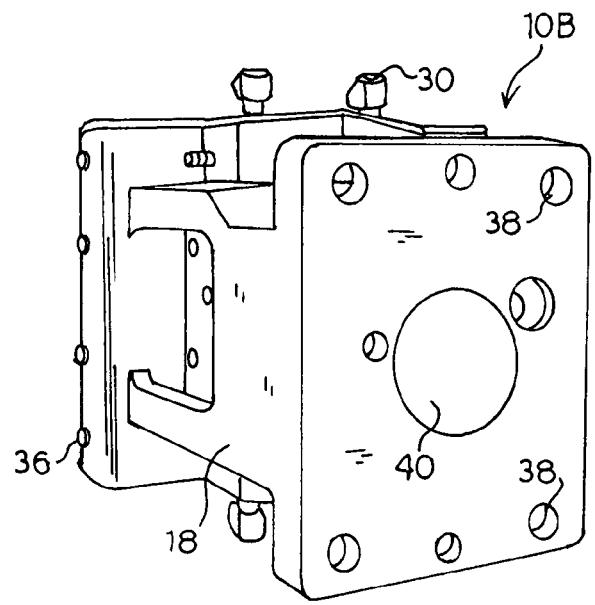
FIG. 8 is a bottom perspective view of an I.D. tool block of the invention.
Figure 9:
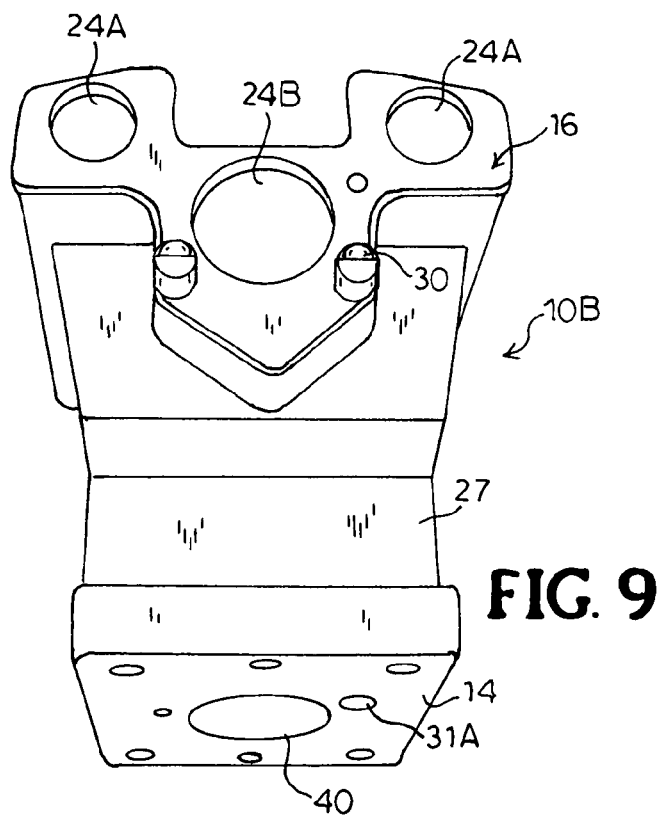
FIG. 9 is a perspective view of a tool-holding side and the bottom of a 6-tool I.D. tool block of the invention.
Figure 10:
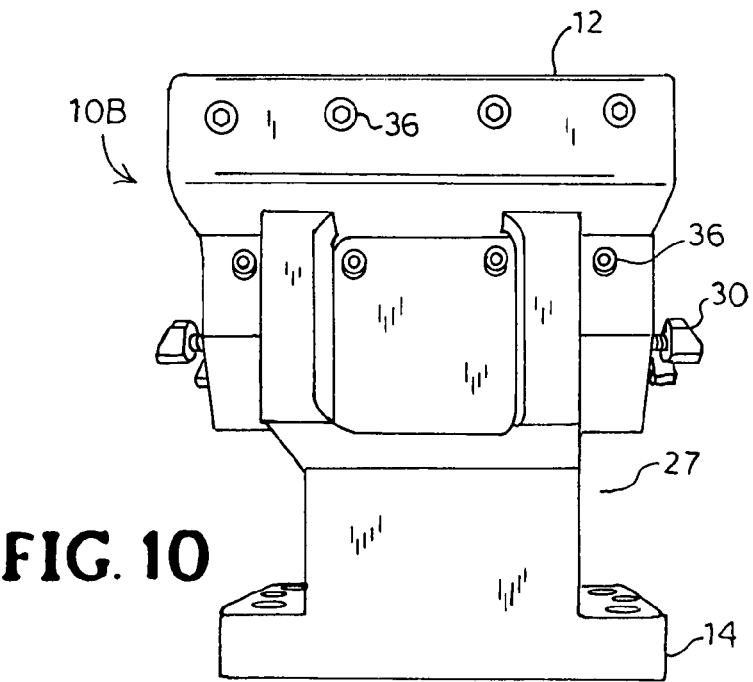
FIG. 10 is a perspective view of a non-tool-holding side of an I.D. tool block of the invention.

While the tool station blocks 10A,B of the invention are generally rectangular blocks with each side having four edges, there are various slots and angles in the sides that cut into the otherwise straight edges, and a particular edge may be bent or sloped between slots (e.g. the top of the block shown in FIG. 7). As used herein the term "generally rectangular" means that one or all of the four sides may vary from strictly rectangular by having only two parallel sides and having adjacent edges that are not perpendicular so that a particular side may be trapezoidal with angles between adjacent edges varying from 90-degrees as would be the case of strictly rectangular sides (e.g., the non-tool-holding sides shown in FIG. 14). Thus, for the base, sides and top, the sizes of these rectangles may vary and the deviation from rectangular may vary depending on the requirements of the machine for which the tool block is designed, the number of tools for which it is designed, and other operational requirements. In any case, the tool blocks have four sides, a top and a base, each of which is generally rectangular. When all sides are rectangular, each side is parallel to an opposing side and perpendicular to the other two sides; however, because not all sides may be rectangular as discussed above, but may only be generally rectangular, each side may only be close to being parallel to the opposing side with there being a slight slope of a particular side toward its opposing side. As used herein, this configuration is considered to be "parallel" to the opposing side.

Each tool station block 10 has four sides, two of which are always non-tool-holding sides 18. There may be one or two tool-holding sides 16 on a block, primarily depending on whether the tool station block is made for a single spindle or dual spindle y-axis machine. When there is only one tool-holding side 16, the remaining side is referred to herein as an unused side 20.

Referring to the figures, for a one-spindle machine, there is only one tool-holding side 16 on the tool station block, as shown in FIGS. 13-16 for an O.D. tool station block. For two-spindle machines, there are two tool-holding sides 16 on each tool station block, each of which may have 2-3 tool slots 22A,B (O.D.) or tool bores 24A,B (I.D.) as shown in FIGS.

1-2 (O.D. tool station block 10A with two tool-holding sides 16, two tool slots 22A per tool-holding side 16), FIGS. 3-6, 12 and 18-20 (O.D. tool station block 10A with two tool-holding sides 16, three tool slots 22A,B per tool-holding side 16); and FIGS. 7-11 (I.D. tool station block 10B with two tool-holding sides 16, three tool bores 24A,B per tool-holding side 16).

Figure 1:
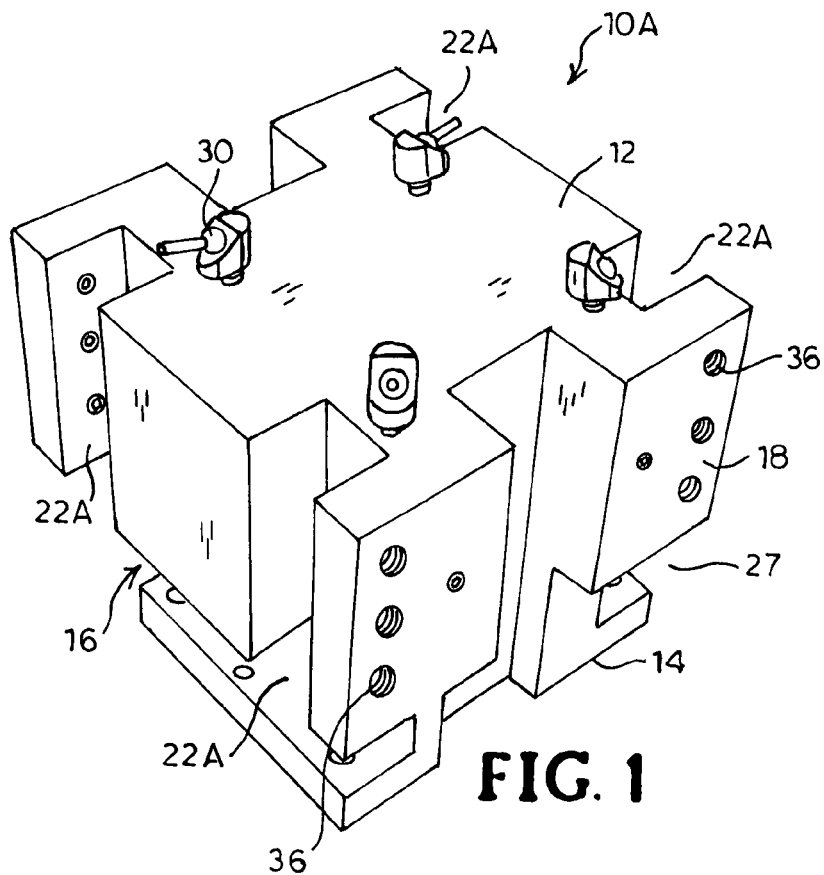
FIG. 1 is a perspective view of a 4-tool O.D. tool block of the invention.
Figure 2:
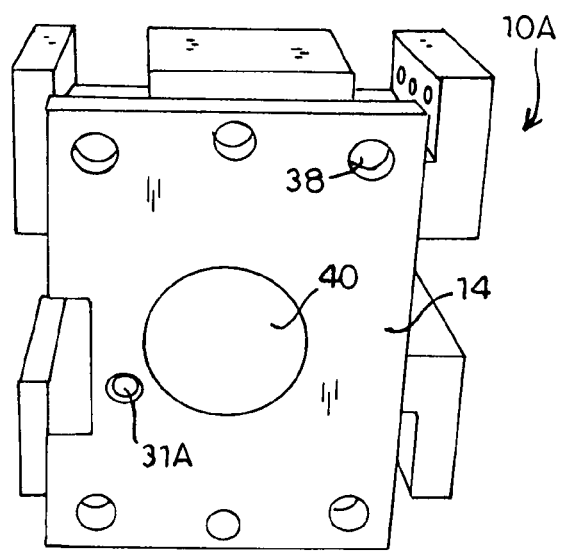
FIG. 2 is a bottom perspective view of a 4-tool O.D. tool block of the invention.
Figure 3:
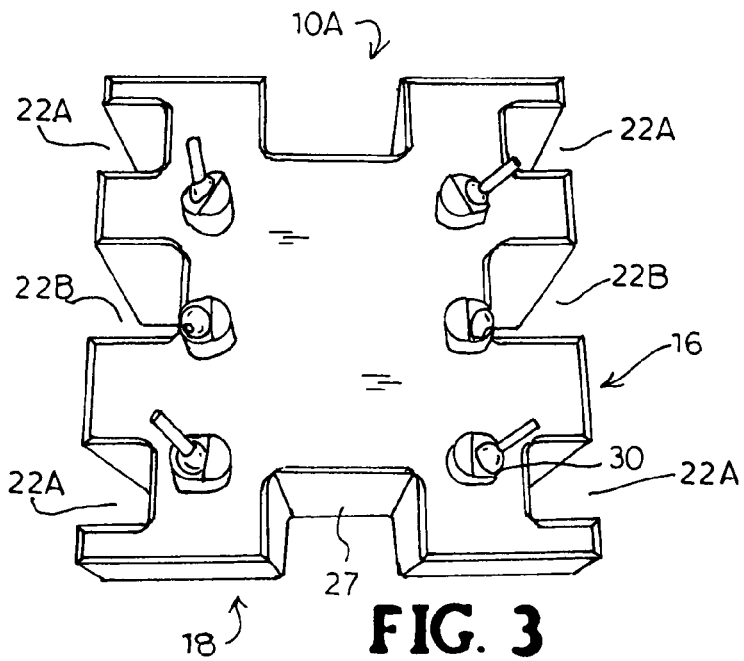
FIG. 3 is a top perspective view of a 6-tool O.D. tool block of the invention.
Figure 4:
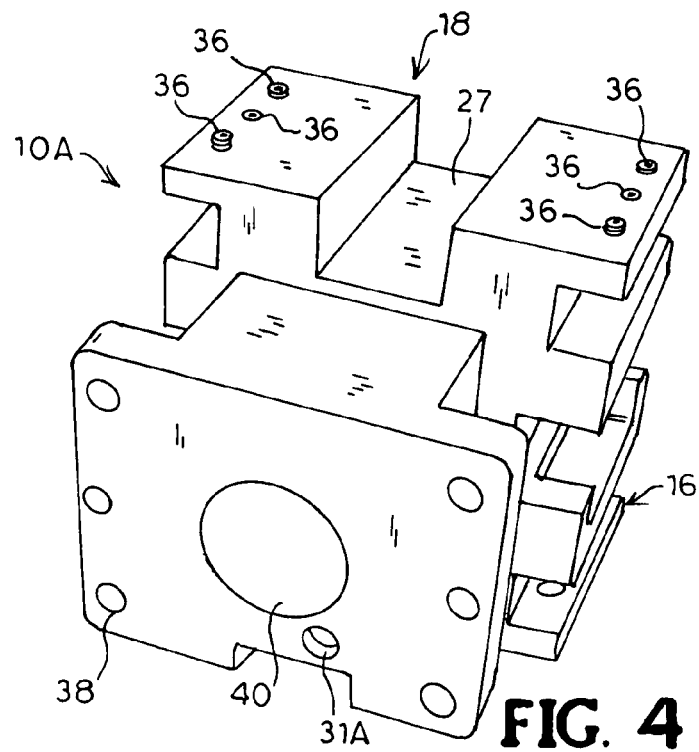
FIG. 4 is a bottom perspective view of a 6-tool O.D. tool block of the invention.
Figure 5:
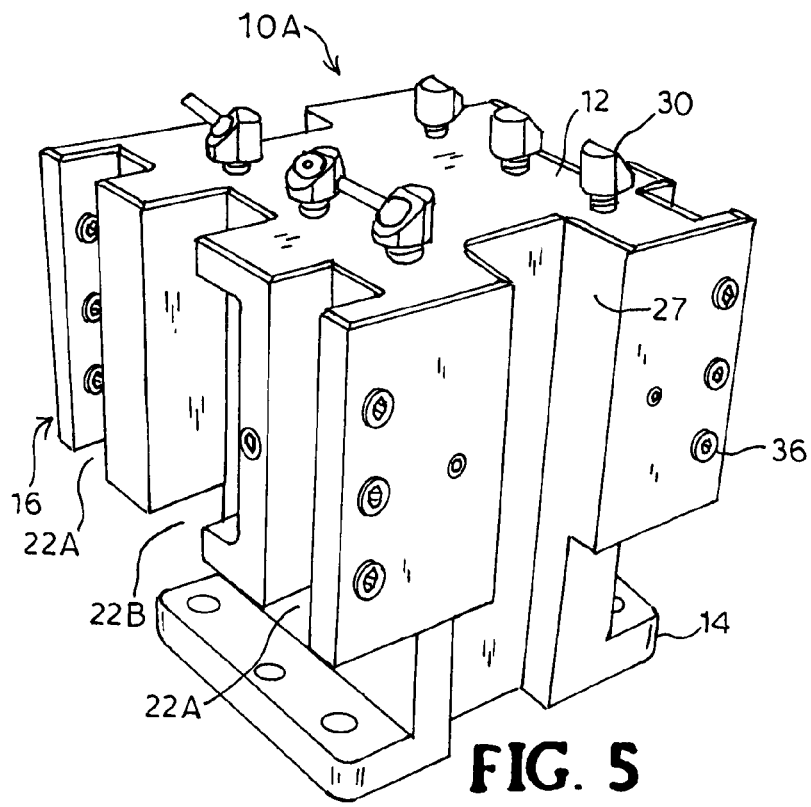
FIG. 5 is a perspective view of a tool-holding side of a 6-tool O.D. tool block of the invention.
Figure 6:
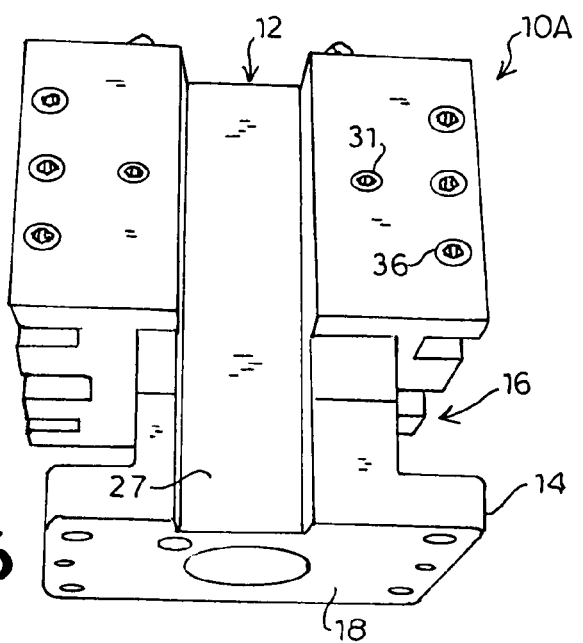
FIG. 6 is a side perspective view of a non-tool-holding side of a 6-tool O.D. tool block of the invention.

As mentioned above, each tool-holding side 16 of an O.D. tool station block 10A may have 2 or 3 tool slots 22A,B. When there are two tool slots 22A, they are parallel to each other and to the edges of the tool-holding side 16 as shown in FIGS. 1-2. When there are three tool slots, there is an additional central tool slot 22B, between and parallel to the two parallel tool slots 22A as shown in FIG. 3. For larger machines, larger tool blocks may be designed, having even more tool slots 22A,B, without departing from the invention herein.

Figure 15:
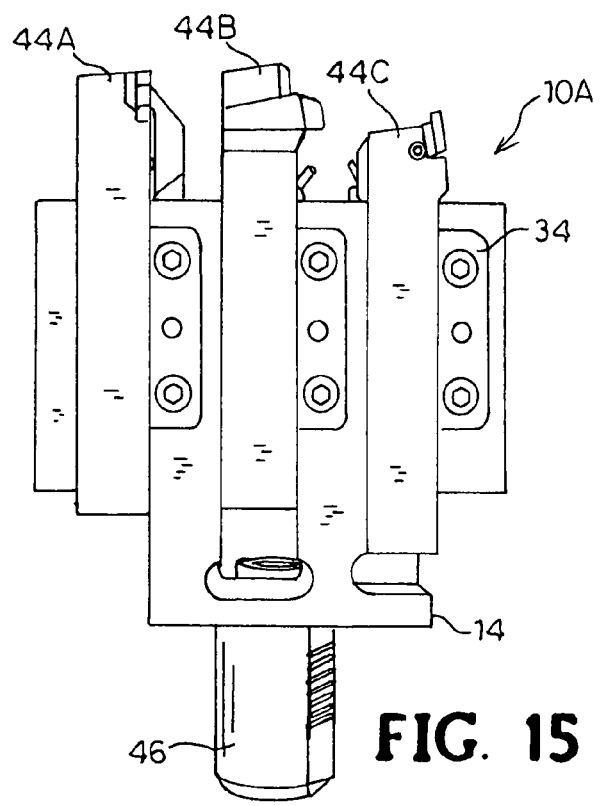
FIG. 15 is an elevational view of the block of FIG. 13 with tools in the tool-holding spaces.
Figure 16:
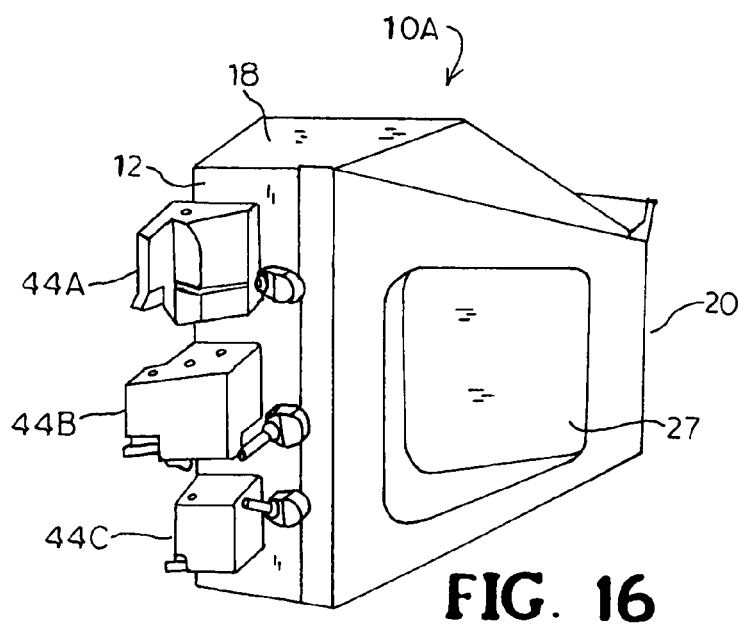
FIG. 16 is a top perspective view of the block of FIG. 15.

FIGS. 15-16 show an O.D. tool station block 10A structured to have a base 14 and size and shape to fit on a single spindle Mazak Nexus 350 MY machine, used for turning (e.g. rougher, finisher, threader, groover, knurling), using a standard VDI other base attachment means as known in the art. This tool station block 10 is shown as having tools mounted on the one tool-holding side that has three tool slots 22A,B, and in particular has two tool slots 22A and one tool slot 22B. The O.D. tools mounted on this tool station block 10A are: tool 44A (deep groover), tool 44B (rough, finishing, turning) and tool 44C (O.D. threader). Other O.D. tools may of course be interchangeably mounted in tool station block 10A.

For I.D. tools, the tool-holding sides 16 of the tool station block 10B preferably have 2-3 parallel tool bores 24A,B extending into the tool station block 10B perpendicular to the tool-holding side 16 as shown in FIG. 7. As shown in FIG. 7 the centerline tool bore 24B is located between the off-center tool bores 24A. Locating the centerline tool bore 24B below the off-center tool bores 24A makes it easier to have set screw holes 36 positioned along a weight reduction slot 27 between the off-center tool bores 24A. The respective locations of the centerline tool bore 24B and the off-center tool bores 24A enable centerline drilling off-center drilling respectively.

Figure 11:
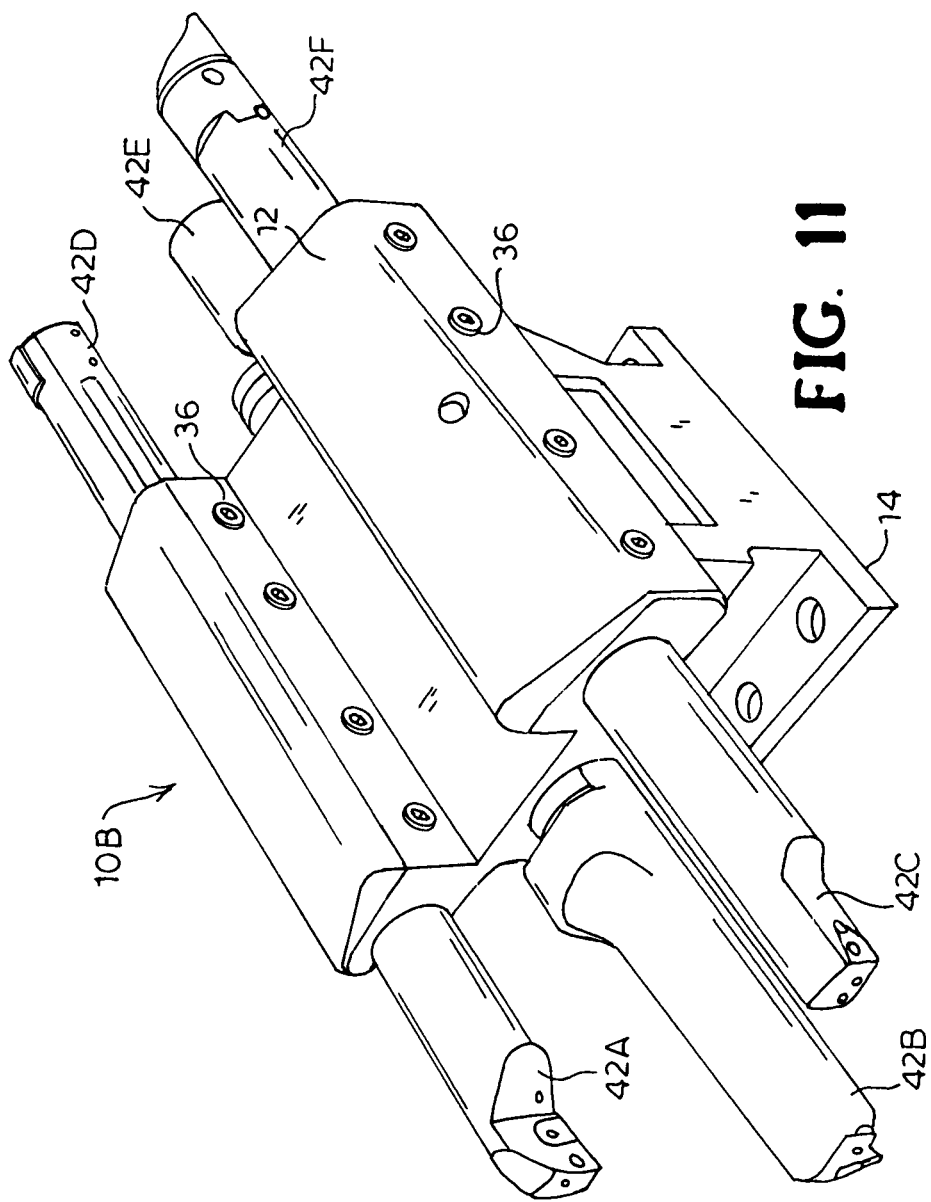
FIG. 11 is a perspective view of a 6-tool I.D. block with six tools mounted thereon.

For a two-spindle machine, two sides of the tool station I.D. block 10B have tool bores as shown in FIG. 11. FIG. 11 is shown as having six different I.D. tools 42A-F as known in the art mounted in the tool station block 10B, as follows tool 42A (boring bar or finish bore), tool 42B (kub drill, an indexable drill, rough), tool 42C (I.D. threader), tool 42D (trepan, which cuts face grooves), tool 42E (flat bottom drill), and tool 42F (rough boring bar, "rougher"). Other I.D. tools may of course be interchangeably mounted in tool station block 10B.

To decrease the weight of the tool station blocks, long narrow bores as known in the art may be drilled in the steel block and those not needed for cooling of the block during use of the tool station block may be filled with pipe plug as known in the art. In addition, weight reduction areas 27 as shown for example, in FIGS. 1, 4-6, may be made in non-tool-holding sides to reduce block weight. Reducing the dimensions in particular areas not only reduces weight, but also provides new angles and surface adjacent to tool slots 22A,B and tool bores 24A,B for adding holes 36 for set screws to hold tools in the appropriate places on the tool station blocks.

Figure 13:
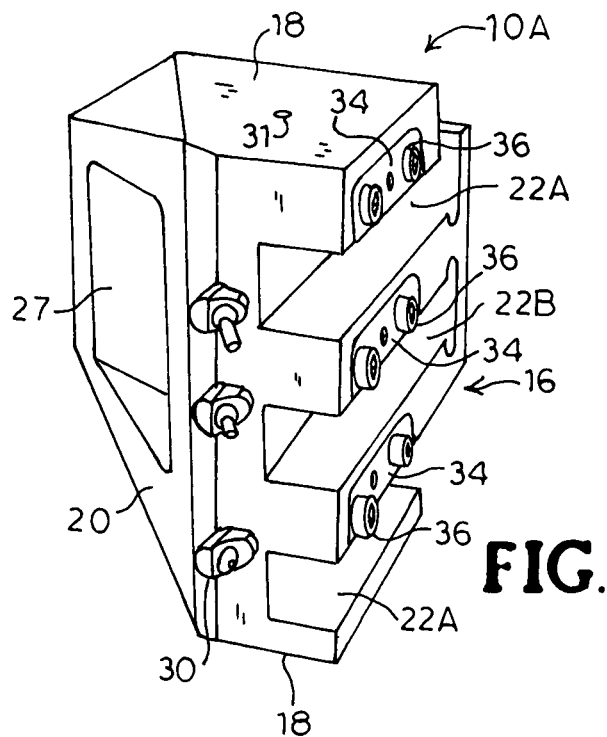
FIG. 13 is a top perspective view of a 3-tool (single spindle) O.D. block made for a turning machine known in the art, having wedge spaces for each tool, showing wedge pieces in the wedge spaces.
Figure 14:
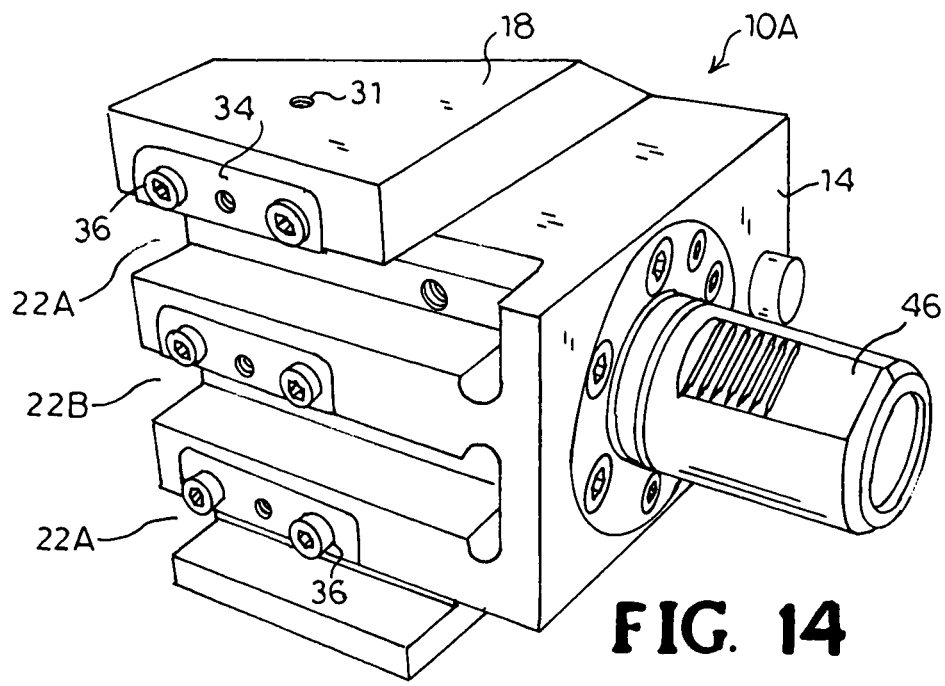
FIG. 14 is a side perspective view of the block of FIG. 13.

Coolant nozzles 30, as known in the art provide areas for coolant to bathe the tools and the tool station block, with the coolant flowing through coolant bores that extend from coolant openings 31A at the bottom of the tool station blocks through the blocks. The coolant bores generally begin on the base 14 of the tool station blocks as is known in the art (FIGS. 2, 4, and 9) and extend through the tool station blocks to the coolant nozzles 30 that may be used to release coolant to the outside of the tool station block, or to pipe plugs 31 that plug the holes to keep coolant from exiting the tool station block (FIGS. 13-14). As known in the art, depending on the shape and function of the tool station block, there may be internal coolant bores and tubes and/or external coolant nozzles that may be adjustable to be aimed at the tools or other areas of the block needing cooling.

Figure 17:
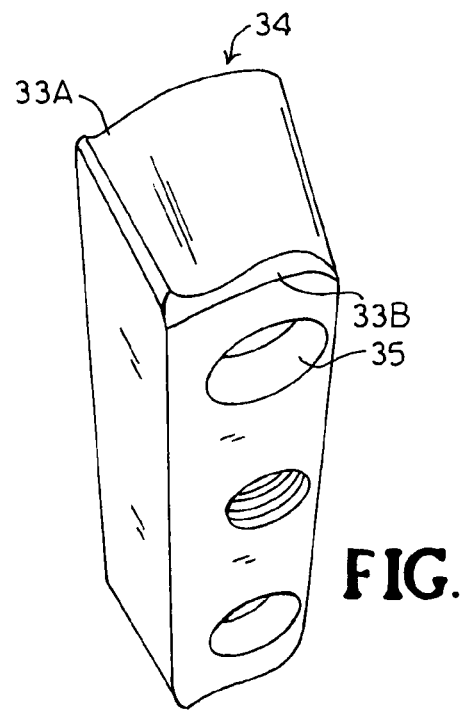
FIG. 17 is a perspective view of the side and top of a wedge of the invention.

It is known in the art to use two-part wedge pieces to hold tools in grooves on tool blocks. Typically these prior wedge pieces are two sloping wedge pieces which are forced between a tool and the sides of the prior-holding positions as a shim, and then bolted in, to hold the tool firmly in place. Preferably in the invention herein, there is an integrated wedge piece 34 used in one or more of the tool slots 22A,B on O.D. tool station blocks 10A as shown in FIG. 17. Each wedge piece 34 is sloped to be narrower at the back 33B than the front 33A as shown, and to fit into a sloped wedge site 32 that is adjacent and connected to a tool slot 22A,B. Each sloped wedge site 32 is wider at its opening and slopes into the tool station block 10A to a narrower area as shown. A plurality of holes 35 in the wedge piece 34 is used with cap screws as known in the art to tighten the wedge piece 34 into a sloped wedge site 32 adjacent the tool slot 22A,B. Generally it is sufficient to tighten the screws by hand with a wrench, with it being best to torque them 18 foot pounds.

Figure 18:
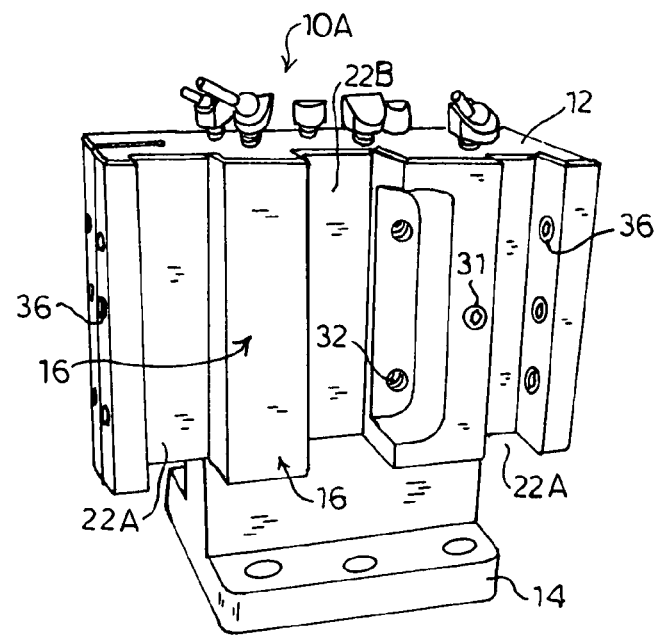
FIG. 18 is a side perspective view of a tool holding side of a 6-tool O.D. tool block showing the wedge location.
Figure 19:
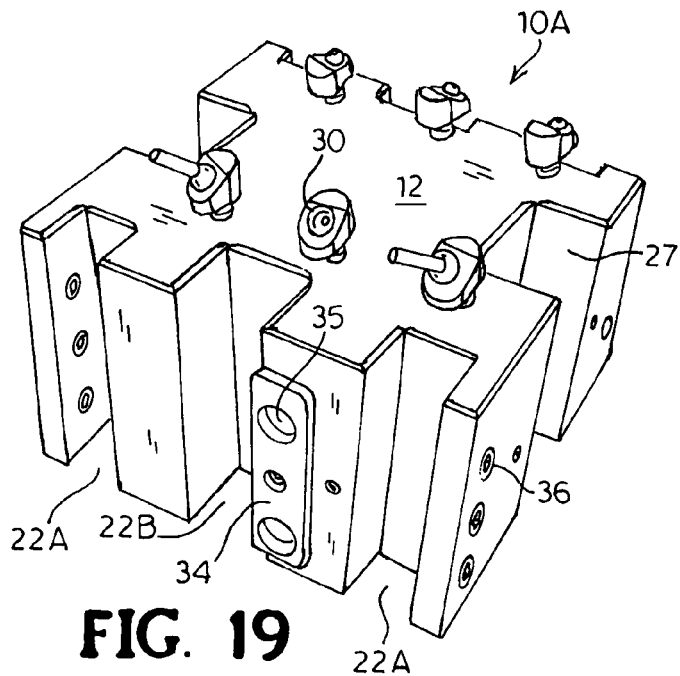
FIG. 19 is a perspective view of the tool block of FIG. 18, with a wedge placed in the wedge location.
Figure 20:
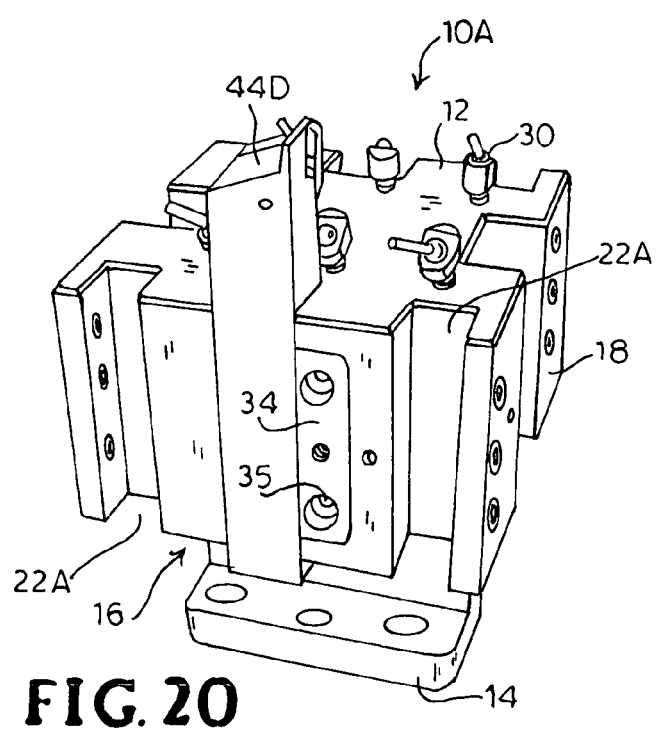
FIG. 20 is a perspective view of the tool block of FIGS. 18-19 with a tool placed in the central tool slot.

FIG. 12 shows a tool station block 10A for a two-spindle machine, having two tool-holding sides 16 with a sloped wedge site 32 adjacent each tool slot 22A,B. To form the sloped wedge site to hold a tool in a particular tool slot, a depression that is sized to hold a wedge piece 32 is milled in the tool station block along one side of the tool slot. FIGS. 13-14 show a wedge piece 32 in each of three sloped wedge sites on a tool station block 10A for a single spindle machine (one tool-holding side 16). FIG. 15 shows the same tool station block 10A having three tools 44A-C mounted thereon. FIGS. 18-20 show a tool station block 10A having a sloped wedges site 30 on just the central tool slot 22B, with FIG. 19 showing a wedge piece 34 mounted thereon and FIG. 20 having both a wedge piece 34 and a tool 44D (an O.D. groover).

The tool station block 10 mounts to the turret in the same manner as prior tool blocks, and the turning, grooving, threading, drilling, and/or boring tools are mounted on the block 10. The tool station block 10 of the invention allows multiple tools 12 to be loaded on the block in a y axis plane. Utilizing y offsets, defined as the distance from $y_0$ (distance from the centerline along the y-axis, the invention facilitates O.D. or I.D. operations without indexing (rotating) the turret. Thus, without any offset, the selected tool station block may be aligned, for example, to do turning, grooving, threading, drilling, boring and other functions known in the art, each of these functions being done in either an O.D. or I.D. operation on the work piece depending on which tools are placed in the 6 positions of the tool station block and whether the tool station block is offset to one side or the other.

To use the invention, one mounts the tool station block onto the turret of the multi-axis machine, and then, puts the various desired tools into the block using the provided mounting slots and set screws. Next, one uses the x, z, and y offsets on the machine to set the tools in relation to the work piece. Thus, to use the tool blocks 10A,B of the invention, the tool blocks are selected for the project to be completed with the machine and are mounted on the machine placing the bases 14 of the blocks on the machine and firmly fastening them to the turret of the y-axis of the machine in the same manner as done with prior tool blocks. The selected tools are placed in the tool slots (O.D.) or tool bores (I.D.), and tightened therein using set screws and/or wedge piece and cap screws as discussed above. Once the tools are mounted (e.g., bolted and/or attached with VDI assemblies or others known in the art) on the tool station block of the invention, they may be allowed to remain on it, or as known in the art, the tools may changed when the machine is being set up for new functions on a work piece. The machine is programmed using software that comes with the machine for a sequence of functions, so that for each function to be performed on the work piece, the operator may do steps including the following: choosing a spindle, if more than one spindle is on the machine, choosing a tool block (either O.D. or I.D.), choosing a tool on that tool block, and setting the amount of offset, if any, from the center line for the appropriate function of that tool on the work piece to achieve the desired result. Each cut to be made on the work piece is programmed into the machine in the appropriate sequence to result in the desired end product.

The tool station block 10 of the invention can be made on a milling machine of almost any type or even on a multi-axis lathe with live tooling. Typically, the tool station block of the invention is made from a block of heat treatable steel using standard milling tools, and although it could be cast, it preferably is not cast but is a solid piece of drawn steel. It is important that the block be hard but not brittle, and it has been found that steel with a Rockwell hardness scale of 37-39 is satisfactory, so the block does not dent or have pieces of debris ground into it when the tool station block is being used. Steel in the 4000 series known in the art that are high in chromium (e.g., 4140, 4130, and 4340) may be used.

The tool station blocks 10A,B of the invention can be mounted in any configuration on a turret to further improve efficiency in the manufacturing process. Multiple I.D. tools and/or O.D. tools can be used on the same tool station block, but typically, each tool station block is either only for I.D. tools or O.D. tools.

Any type of manufacturing or production facility that produces any type of item which requires turning or milling of material to produce the desired result can benefit from this invention because it can reduce down times and run times therefore increasing efficiency and profitability.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. A tool station block comprising:
   a) four sides, a top and a base, the base structured to fixedly and non-rotatably couple to a y-axis machine turret, the block having an x-axis extending through the top and the base and the y-axis extending perpendicular to the x-axis;
   b) the sides comprising one or two tool-holding sides, each tool-holding side having a plurality of tool-holding positions, each tool-holding position for each block being selected from the group consisting of O.D. tool slots extending between the top and the base, and I.D. tool bores in, and perpendicular to, the tool-holding side, with at least two of the tool-holding positions spaced along the y-axis; and
   c) the sides further comprising two non-tool-holding sides, wherein the non-tool-holding sides oppose each other on opposite sides of the tool station block;

wherein when the tool station block is used, selected tools for machining a work piece are fastened in the tool-holding positions, the tool station block is mounted on the y-axis machine, and the y-axis machine is operated by programmed commands controlling the order of use of the selected tools to machine the work piece.

2. The tool station block of claim 1, wherein the tool-holding positions comprise two parallel tool slots on one of the tool-holding sides, the tool slots parallel to the x-axis.

3. The tool station block of claim 1, wherein the tool-holding positions comprise two parallel tool slots on each tool-holding side, the tool slots parallel to the x-axis.

4. The tool station block of claim 1, wherein the tool-holding positions comprise three parallel tool slots on each tool-holding side, comprising a central tool slot between two parallel side tool slots the tool slots parallel to the x-axis.

5. The tool station of claim 4, wherein the central tool slot has a sloped wedge site adjacent and opening to the tool-holding slot, so that a sloping wedge piece may be placed in the sloped wedge site and tightened to hold a tool in the tool-holding slot.

6. The tool station block of claim 4, wherein all three parallel tool-holding slots have a sloped wedge site adjacent and opening to the tool-holding slot, so that a sloping wedge piece may be placed in each sloped wedge site and tightened to hold a tool in the tool-holding slot.

7. The tool station block of claim 1, wherein the tool-holding positions comprise two tool bores in one of the tool-holding sides, the tool bores spaced along the x-axis.

8. The tool station block of claim 7, wherein there are two tool bores on each tool-holding side.

9. The tool station block of claim 1, wherein the tool-holding positions comprise three tool bores on one of the tool-holding sides, and wherein the three tool bores comprise a centerline tool bore located between two off-center tool bores.

10. The tool station block of claim 1, further comprising weight reduction areas on the non-tool-holding sides.

11. The tool station block of claim 1, wherein all corners formed between sides of the tool station block are chamfered.

12. The tool station block of claim 1, further comprising coolant nozzles on the top.

13. The tool station block of claim 1, wherein the base has holes for bolting the multiple tool station block to a turret of a y-axis machine.

14. The tool station block of claim 1, wherein the base comprises a plate with bolt holes.

* * * * *